United States Patent
Aviyam et al.

(10) Patent No.: US 11,874,894 B2
(45) Date of Patent: Jan. 16, 2024

(54) WEBSITE BUILDER WITH INTEGRATED SEARCH ENGINE OPTIMIZATION SUPPORT

(71) Applicant: Wix.com Ltd., Tel Aviv (IL)

(72) Inventors: Yuval Aviyam, Rishon Lezion (IL); Alon Rousso Katz, Hod Hasharon (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 17/727,863

(22) Filed: Apr. 25, 2022

(65) Prior Publication Data

US 2022/0245207 A1 Aug. 4, 2022

Related U.S. Application Data

(63) Continuation of application No. 16/043,189, filed on Jul. 24, 2018, now Pat. No. 11,314,837.

(60) Provisional application No. 62/624,824, filed on Feb. 1, 2018, provisional application No. 62/536,403, filed on Jul. 24, 2017.

(51) Int. Cl.
| | |
|---|---|
| *G06F 16/958* | (2019.01) |
| *G06N 20/00* | (2019.01) |
| *G06F 16/2457* | (2019.01) |
| *G06F 16/9535* | (2019.01) |
| *G06F 16/957* | (2019.01) |

(52) U.S. Cl.
CPC ...... *G06F 16/958* (2019.01); *G06F 16/24578* (2019.01); *G06F 16/9535* (2019.01); *G06F 16/9577* (2019.01); *G06F 16/986* (2019.01); *G06N 20/00* (2019.01)

(58) Field of Classification Search
CPC ............. G06F 16/24578; G06F 16/958; G06F 16/986; G06F 16/9535; G06F 16/9577; G06N 20/00
USPC ........................................ 707/706, 713, 748
See application file for complete search history.

(56) References Cited

U.S. PATENT DOCUMENTS

| | | | |
|---|---|---|---|
| 8,959,427 B1 * | 2/2015 | Carlsson ............... | G06F 16/958 |
| | | | 715/236 |
| 9,195,753 B1 * | 11/2015 | King ................... | G06F 16/9535 |
| 9,436,765 B2 | 9/2016 | Abrahami | |
| 9,747,258 B2 | 8/2017 | Ben-Aharon | |
| 9,996,566 B2 | 6/2018 | Ben-Aharon | |
| 10,073,923 B2 | 9/2018 | Koren | |

(Continued)

*Primary Examiner* — Phong H Nguyen
(74) *Attorney, Agent, or Firm* — HEIDI BRUN ASSOCIATES LTD.

(57) ABSTRACT

A tool to enable a search-engine optimized website within a WBS (website building system) The tool includes at a database storing WBS component compositions and SEO (search engine optimization) information drawn from sources internal and external to the WBS relating to the component compositions having at least one of: design and content; an analyzer to gather and analyze the SEO information for the WBS component compositions and to provide an SEO ranking for them; an editor to enable a designer of a website using the WBS to create and edit a website page using at least one user selected component composition from the WBS component compositions and a recommender to receive the at least one user selected component composition and to compare it with the results of the analyzer and to recommend to the designer, search engine friendly recommendations for improved website optimization based on the SEO ranking.

16 Claims, 10 Drawing Sheets

(56) References Cited

U.S. PATENT DOCUMENTS

| | | | |
|---|---|---|---|
| 10,185,703 B2 | 1/2019 | Abrahami | |
| 2001/0049297 A1 | 12/2001 | Hibscher | |
| 2007/0067297 A1 | 3/2007 | Kublickis | |
| 2008/0077556 A1 | 3/2008 | Muriente | |
| 2008/0168048 A1* | 7/2008 | Bell | G06F 16/951 707/999.005 |
| 2009/0132524 A1 | 5/2009 | Stouffer | |
| 2010/0114916 A1 | 5/2010 | Cooke | |
| 2012/0047120 A1* | 2/2012 | Connolly | G06F 16/958 707/706 |
| 2013/0219281 A1 | 8/2013 | Trevelyan | |
| 2014/0095427 A1 | 4/2014 | Fox | |
| 2014/0282218 A1 | 9/2014 | Kaufman | |
| 2015/0379141 A1* | 12/2015 | Stouffer | G06F 16/951 707/706 |
| 2016/0217328 A1 | 7/2016 | Yanai | |
| 2017/0344656 A1* | 11/2017 | Koren | G06F 16/958 |
| 2018/0032626 A1 | 2/2018 | Ben-Aharon | |
| 2018/0174229 A1 | 6/2018 | Sherwin | |
| 2018/0293323 A1 | 10/2018 | Abrahami | |

\* cited by examiner

FIG. 3A tz17 > Get Found on Google 

To update your SEO changes Publish your site from the... (Go to Editor x)

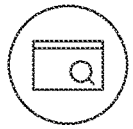

Welcome to Your SEO Plan

SEO Wiz    Keywords:   beasts   gandalf   magical   strange creatu...   the strange Home Setting Checklist

SITE & HOMEPAGE

SEO Guide

 Site is Mobile friendly

 Homepage's SEO title is ready

 Change the Homepage's SEO description

 Optimize the Homepage's content

Support     Update the contact info on the Homepage

FIG. 3B

WEBSITE BUILDER WITH INTEGRATED SEARCH ENGINE OPTIMIZATION SUPPORT

CROSS REFERENCE TO RELATED APPLICATIONS

This application is a Continuation Application of U.S. patent application Ser. No. 16/043,189 filed Jul. 24, 2018 which claims priority and benefit from U.S. Provisional Patent applications 62/536,403, filed Jul. 24, 2017 and 62/624,824, filed Feb. 1, 2018, all of which are incorporated herein by reference.

FIELD OF THE INVENTION

The present invention relates to website building systems generally and to search engine optimization in particular.

BACKGROUND OF THE INVENTION

Website building systems have become very popular and allow novice website builders to build professional looking and functioning websites. Many of these systems provide both the novice and experienced user ways of building websites from scratch.

A website building system may be a standalone system, or may be embedded inside a larger editing system. It may also be on-line (i.e. applications are edited and stored on a server), off-line or partially on-line (with websites being edited locally but uploaded to a central server for publishing).

Website building system users (also known as designers, subscribers, subscribing users or site editors) design the websites and end-users (the "users of users") access the finished websites created by the users. Although end-users typically access the system in read-only mode, website building systems (and websites) may allow end-users to perform changes to the website, such as adding or editing data records, adding talkbacks to news articles, adding blog entries to blogs etc. The website building system may in fact allow multiple levels of users (i.e. more than two levels), and assign different permissions and capabilities to each level.

Users of the website building system (in particular in the full or partial on-line configurations) may be registered on the website building system server which manages the users and their websites which are accessed by the end-users.

The website building system may use an internal data architecture to store website building system based sites and this architecture may organize the handled site's internal data and elements inside the system. This architecture may be different from the external view of the site (as seen, for example, by the end-users). It is also typically different from the way the HTML pages sent to the browser are organized. For example, the internal data architecture may contain additional properties for each element in the page (creator, creation time, access permissions, link to templates, SEO (search engine optimization) related information etc.) which are relevant for the editing and maintenance of the site in the website building system, but are not externally visible to end-users (or even to some editing users).

A website building system is typically made up of a visually designed application (e.g. a website) consisting of pages, containers and components. Pages may be displayed separately and may contain components. A website building system may support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, and each of which may contain multiple components. Some container components may display just one of the mini-pages at a time, while others may display multiple mini-pages simultaneously. Reference is now made to FIG. 1 which illustrates a typical representation of a website building system 1 comprising a website 2 having webpages 3 which can be made up of components 4 further made up of atomic components 5 and container components 6. A container component 6 may be further comprised of various single page containers 7 and multi-page containers 8, further containing mini-pages 9. Other component types may include a semantic composite 11, a data/text repeater 12 and an image repeater 13.

The components may be content-less, or have internal content. An example of the first category is a star-shape component, which does not have any internal content (though it has color, size, position and some other parameters). An example of the second category is a text paragraph component, whose internal content includes the internal text, as well as font, formatting and layout information. This content may, of course, vary from one instance of the text paragraph component to another. Components which have content are often referred to as "fields" (e.g. a "text field").

Pages may also use templates, general page templates or component templates. Specific cases for templates include the use of an application master page containing components replicated in all other regular pages, and the use of application header/footer (which repeat on all pages). Templates may be used for the complete page or for page sections. The website building system may provide inheritance between templates, pages or components, possibly including multi-level inheritance, multiple inheritance and diamond inheritance (i.e. A inherits from B and C and both B and C inherit from D).

The visual arrangement of components inside a page is known as layout. The website building system may support dynamic layout processing, a process whereby the editing of a given component (or other changes affecting it such as externally-driven content change) may affect other components, as further described in US Patent Publication No. 2013-0219263 entitled "Web site Design System Integrating Dynamic Layout and Dynamic Content" published on 22 Aug. 2013, issued as U.S. Pat. No. 10,185,703 on Jan. 22, 2019, incorporated herein by reference and assigned to the common assignee of the current invention.

A website building system may also be extended using a third party application and its components as well list applications (as further described in US Patent Publication No. 2014/0282218 entitled "Device, System, and Method of Website Building by Utilizing Data Lists" published 18 Sep. 2014, incorporated herein by reference and assigned to the common assignee of the current invention). These third party applications and list applications may be added and integrated into designed websites.

Such third party applications and list applications may be purchased (or otherwise acquired) through a number of distribution mechanisms, such as being pre-included in the website building system design environment, from an Application Store (integrated into the website building system or external to it) or directly from the third party application vendor.

The third party applications may be hosted on the website building system vendor's own servers, the third party application vendor's server or on a 4$^{th}$ party server infrastructure.

The website building system may allow procedural code to be added to some or all of the system's entities. Such code could be written in a standard language (such as JavaScript), an extended version of a standard language or a language proprietary to the specific web site building system. The executed code may reference APIs provided by the website building system itself or external providers. The code may also reference internal constructs and objects of the website building system, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions.

The activated code may be executed inside the client element of the website building system, the server platform, a combination of the two or a dynamically determined execution platform. Such a system is described in US Patent Publication No. US 2018/0174229 entitled "Actionable Widget Cards" published on 21 Jun. 2018 and issued as U.S. Pat. No. 11,087,389 on Aug. 10, 2021, and U.S. Provisional Application No. 62/536,403 filed on 24 Jul. 2017 both of which are incorporated herein by reference and assigned to the common assignee of the current invention.

Typical site creation may be based on a number of models, including a visual editing model (in which the user edits a previously created site) and an automatic site generation model, or a combination thereof.

In the visual editing model, the user (designer) creates or edits a site based on one or more website templates. The website building system provider may provide multiple site (or other) templates, with each template possibly including a complete sample website, a website section, a single page or a section of a page. Users may have the option to start with an empty site (essentially a "blank page" template) but typically start with an actual site template.

The website building system provider may provide site templates ranging from the very generic (e.g. mobile site, e-store) through to the more specific (e.g. law office, restaurant, florist) to the highly specific ones (e.g. a commercial real-estate law office or a Spanish tapas restaurant). Such templates are typically stored in a repository accessible to users of the website building system and are typically classified according to business type, sub-type or industry. Templates may also be created (and classified) according to style, color range or other parameters and not just according to business type. Site templates may be extended with additional (typically back-end) functionality, services and code so as to become full-fledged vertical solutions integrated with the website building system.

Thus when creating a site using a web site building system visual editor, the user typically chooses a template (e.g. according to style or industry type/sub-type) or possibly a blank template. The user then edits the template in the visual editor, including editing of content, logic, layout and attributes. Such editing would include (in particular) adapting the template and its elements to the details of the user's business. The site is then then published.

Alternatively, the website building system may generate an initial site for the user, based on a selected template, possibly modified by filling-in common elements of information, and possibly allowing follow-up editing of the generated site such as described in US Patent Publication No. US 2017/0344656 entitled "System and Method For the Creation and Update of Hierarchical Websites Based on Collected Business Knowledge" published on 30 Nov. 2017, and issued as U.S. Pat. No. 10,073,923 on Sep. 11, 2018, incorporated herein by reference and assigned to the common assignee of the current invention.

Search engines are known in the art which determine the ranking of sites and pages (for a search query based on a given keyword set and possibly connecting search operators) based on multiple factors. Search engines send spiders out to crawl websites repeatedly, with the frequency of scanning typically depending on the importance/ranking of the relevant website and the rate in which the website is updated. The spiders then collect pages from the accessed websites and send them back to the search engine, including any visible page information (such as titles, page content etc.) as well as non-visible information (such as page metadata and explicitly specified page keywords). The search engine then indexes the received pages (based on numerous criteria including: the wording on a page, the placement of the wording on the page, any weights for a particular word, links to and from the page etc.) The searching user may then access the search engine, providing keywords for searching and the search engine will gather matching results based on the provided keywords and the index, rank them according to multiple criteria, and present the ranked results as a search engine result page. Search engine optimization (SEO) is also known in the art as the process of affecting the ranking and online visibility of a website or webpage to searching end-users.

There are positive factors (which improve the ranking) and also some negative factors (such as a black-hat SEO which decreases the ranking). Search engines may automatically brand a website as a "bad" site if it is not found to be particularly search engine friendly or is found to be using "black hat" SEO, and may give the site a low ranking as such. This labeling is liable to remain with a site during its life span even if its optimization is improved at a later stage. It will be appreciated that a bad ranking may be, for example, due to factors such as duplicate content, keyword stuffing and too many advertisements.

Some factors are under the control of the website designer (including both user-visible elements and hidden page elements not displayed by the browser) such as page title, page meta tags/keywords, page content: text, images, notable text (e.g. text marked as H1), color selection (e.g. avoiding a bad SEO such as using white text over white background), page URL, outbound links and links within the site and uniqueness compared to other sites (possibly sites using the same website building system template). Other factors may include: page update rate and having a mobile optimized version. Some factors may also be under the control of the hosting system such as page performance and sitemap use whereas other factors may be outside the control of the website building hosting system such as links to the sites from other sites.

In general, search engine technology now uses AI (artificial intelligence and deep learning particular), so sometimes there are no well-defined criteria or rules for "what is a good/bad SEO". In such a case, the rules are expressed in the current state of the search engine's AI engine (e.g. current neural network connection weights) and may change constantly.

SUMMARY OF THE PRESENT INVENTION

There is provided, in accordance with a preferred embodiment of the present invention, a tool to enable a search-engine optimized website within a website building system. The tool includes a memory unit; at least one processor and at least one database storing web site building system component compositions and at least SEO (search engine optimization) information drawn from sources internal and external to the website building system relating to the component compositions, the component compositions having at least one of: design and content. The tool also includes at least one analyzer to gather and analyze at least the SEO information for the website building system component compositions and to provide an SEO ranking for the website building system component compositions; an editor to enable a designer of a website using the website building system to create and edit a website page using at least one user selected component composition from the website building system component compositions and a recommender to receive the at least one user selected component composition and to compare the at least one user selected component composition with the results of the at least one analyzer and to recommend to the designer via the editor, search engine friendly recommendations for improved web site optimization for the one user selected component composition based on the SEO ranking.

Moreover, in accordance with a preferred embodiment of the present invention, the component compositions are at least one of: components, templates, pre-defined layouts and combinations of other component compositions.

Further, in accordance with a preferred embodiment of the present invention, the recommendation is at least one of a change to: site metadata, a title, a keyword and an attribute.

Still further, in accordance with a preferred embodiment of the present invention, the tool includes an updater to perform adjustment of the at least one user selected component composition according to the recommendation and to update the at least one database according to a user approved the recommendation.

Additionally, in accordance with a preferred embodiment of the present invention, the tool also includes least one of: a multiple site handler to ensure that the used approved recommendation is implemented within other versions of the website having the same site definitions as the web site; and a SEO renderer to render an updated search engine friendly view of the website based on the user approved recommendation.

Moreover, in accordance with a preferred embodiment of the present invention, the at least one analyzer includes a SEO page analyzer to analyze the website page to determine website building system component compositions and to retrieve SEO information from the at least one database accordingly; a website building system SEO site analyzer to analyze the relationship between the website building system component compositions and SEO effectiveness based on at least one of: metadata and keyword use, site elements, content and layout and a metadata, content and design analyzer to correlate at least one of: metadata, content and design for pages of the website used across different websites, designs and site versions with the SEO information to determine the SEO advantage of using at least one of: metadata, content and design; an external site analyzer to analyze search engine results of competitor sites of the website to determine at least one of keyword, design and content rating; and an artificial intelligence/machine learning engine to refine the results of the SEO page analyzer, the website building system SEO site analyzer, the metadata analyzer and the external site analyzer based on at least one of: artificial intelligence and machine learning.

Further, in accordance with a preferred embodiment of the present invention, the at least one analyzer includes at least one of: an editing history analyzer to retrieve and analyze SEO editing history for previous versions of the website, wherein the artificial intelligence/machine learning engine refines the results of the editing history; and a completeness analyzer to compare the results of the SEO page analyzer and the recommender to provide feedback regarding how complete the website is for publication.

Still further, in accordance with a preferred embodiment of the present invention, the recommender includes a component receiver to receive the at least one user selected component composition; and a component SEO ranker to compare the SEO ranking of the at least one user selected component composition with other similar website building system component compositions in the at least one database based on SEO contribution to determine whether the at least one user selected component composition requires adjustment or replacement based on the SEO ranking.

Additionally, in accordance with a preferred embodiment of the present invention, the tool also includes a SEO information gatherer to gather the SEO information via at least one of: receiving HTTP referrer information via a query, interfacing with a search engine vendor provided tool, service or API, using multiple landing pages with different keywords to analyze incoming search traffic and interacting with the search engine to execute queries based on keywords.

Moreover, in accordance with a preferred embodiment of the present invention, the processor activates the tool on at least one of: a component composition change, periodically based on internal check; on each save to the website, pre-publishing and post publishing.

There is provided, in accordance with a preferred embodiment of the present invention, a method for a website building system, the method includes storing website building system component compositions and at least SEO (search engine optimization) information drawn from sources internal and external to the website building system relating to the component compositions, the component compositions having at least one of: design and content; gathering and analyzing at least the SEO information for the website building system component compositions and providing an SEO ranking for the web site building system component compositions; enabling a designer of a website using the website building system to create and edit a website page using at least one user selected component composition from the website building system component compositions; and receiving the at least one user selected component composition and comparing the at least one user selected component composition with the results of the at least one analyzer and recommending to the designer via the editor, search engine friendly recommendations for improved website optimization for the one user selected component composition based on the SEO ranking.

Moreover, in accordance with a preferred embodiment of the present invention, the component compositions are at least one of: components, templates, pre-defined layouts and combinations of other component compositions.

Further, in accordance with a preferred embodiment of the present invention, the recommendation is at least one of a change to: site metadata, a title, a keyword and an attribute.

Still further, in accordance with a preferred embodiment of the present invention, the method also includes performing adjustment of the at least one user selected component composition according to the recommendation and updating the at least one database according to a user approved recommendation.

Additionally, in accordance with a preferred embodiment of the present invention, the method includes at least one of: ensuring that the used approved recommendation is implemented within other versions of the website having the same site definitions as the website; and rendering an updated search engine friendly view of the website based on the user approved recommendation.

Moreover, in accordance with a preferred embodiment of the present invention, the gathering, analyzing and providing includes analyzing the website page to determine website building system component compositions and retrieving SEO information from the at least one database accordingly; analyzing the relationship between the website building system component compositions and SEO effectiveness based on at least one of: metadata and keyword use, site elements, content and layout; correlating at least one of: metadata, content and design for pages of the website used across different websites, designs and site versions with the SEO information and determining the SEO advantage of using the at least one of: metadata, content and design; analyzing search engine results of competitor sites of the website to determine at least one of keyword, design and content rating; and refining the results of the analyzing the website page, the analyzing the relationship, the correlating and determining and the analyzing search engine results based on at least one of: artificial intelligence and machine learning.

Further, in accordance with a preferred embodiment of the present invention, the gathering, analyzing and providing includes at least one of: retrieving and analyzing SEO editing history for previous versions of the website, wherein the refining refines the results of the editing history; and comparing the results of the analyzing the website page and the receiving, comparing and recommending feedback regarding how complete the website is for publication.

Still further, in accordance with a preferred embodiment of the present invention, the receiving, comparing and recommending includes receiving the at least one user selected component composition; and comparing the SEO ranking of the at least one user selected component composition with other similar website building system component compositions in the at least one database based on SEO contribution and determining whether the at least one user selected component composition requires adjustment or replacement based on the SEO ranking.

Additionally, in accordance with a preferred embodiment of the present invention, the method also includes gathering the SEO information via at least one of: receiving HTTP referrer information via a query, interfacing with a search engine vendor provided tool, service or API, using multiple landing pages with different keywords to analyze incoming search traffic and interacting with the search engine to execute queries based on keywords.

Moreover, in accordance with a preferred embodiment of the present invention, the method also includes activating the method on at least one of: a component composition change, periodically based on internal check; on each save to the website, pre-publishing and post publishing.

There is provided, in accordance with a preferred embodiment of the present invention, a tool for a website building system. The tool includes a memory unit; at least one processor; at least one database storing website building system component compositions and at least SEO information drawn from sources internal and external to the website building system relating to the component compositions, the component compositions having at least one of: design and content; at least one analyzer to gather and analyze at least the SEO information for the component compositions and to provide an SEO ranking for the website building system component compositions; a recommender to receive the website building system component compositions and to compare the website building system component compositions with the results of the at least one analyzer and to recommend search engine friendly recommendations for improved website optimization for the website building system component composition based on the SEO ranking.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A and 3B are screenshots of example user interfaces for improving website SEO for a designer of a website;

Figure 1:
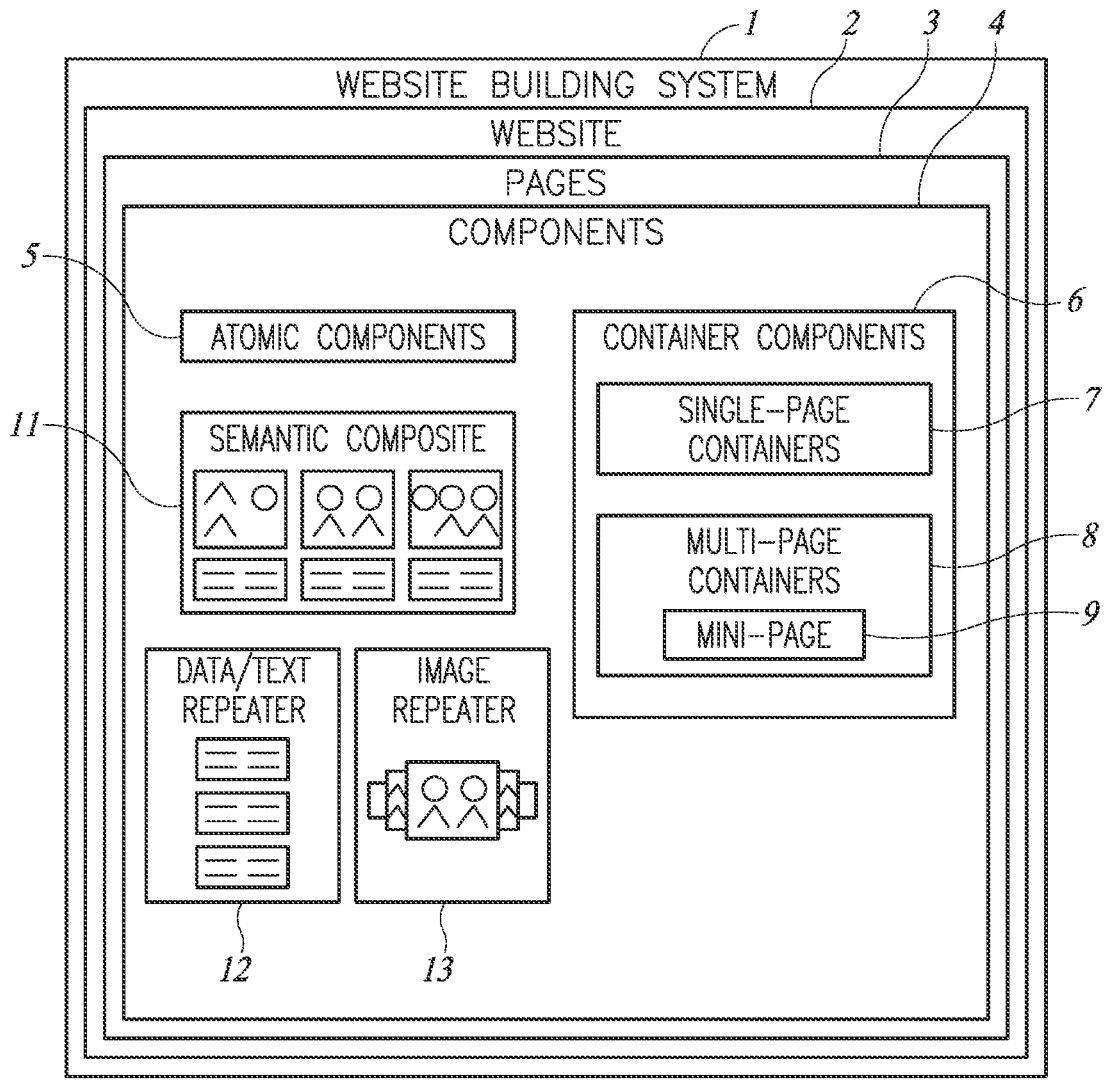
FIG. 1 is a schematic illustration of a typical representation of a website building system and pages created using the website building system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2A:
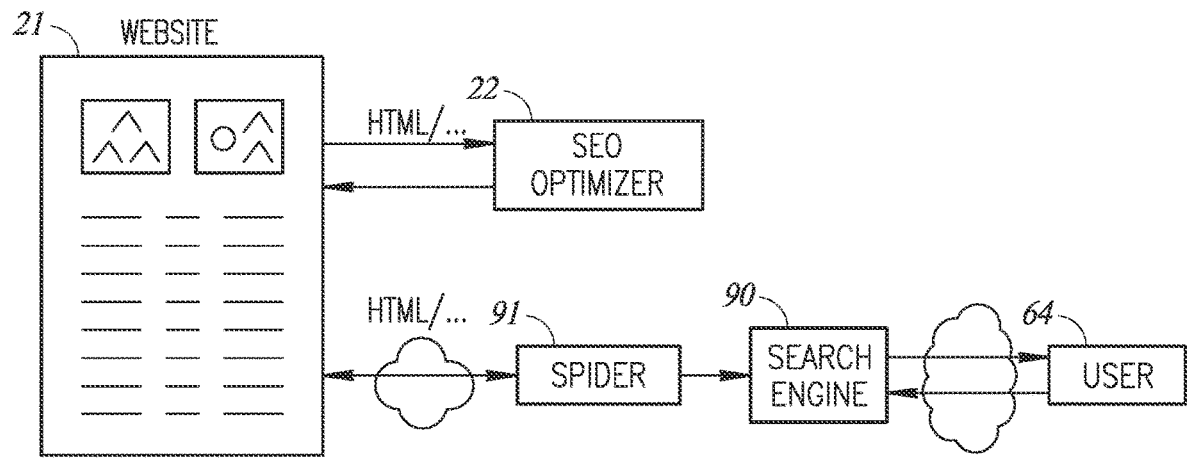
FIGS. 2A and 2B are schematic illustrations of SEO systems of the prior art.
Figure 2B:
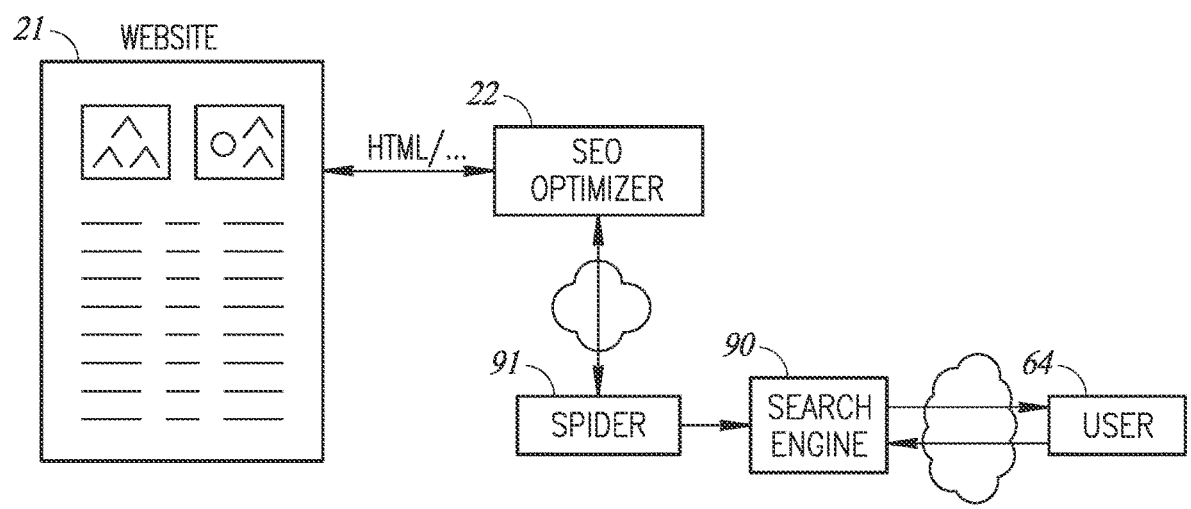

Applicants have realized that the website building systems of the prior art are limited in their search engine optimization (SEO) capabilities. Existing SEO systems are typically adapted to regular sites and not website building system sites. They work on the "post editing"/published site and not at the website building system stage. Thus they can only analyze and affect the final (published) form of the website (HTML, CSS, JS, . . . ). Reference is now made to FIGS. 2A and 2B which illustrate typical search engine optimization embodiments of the prior art. In FIG. 2A, the finished website 21 is sent though an optimizer 22 which modifies the site's final form information (as discussed herein above) which is retrieved by spider 91. The modified final form information, when indexed by search engine 90 and later accessed based on a query made by an arbitrary end user 64 using search engine 90 (to perform a search), will give website 21 a better search engine result positioning (known as search engine result pages SERP). It will be appreciated that existing SEO systems may either modify the site's stored final form (as shown in FIG. 2A), or act as an intermediary (e.g. proxy server) between the web server and the accessing search engine spider, providing the modified version (as shown in FIG. 2B).

Applicant has also realized that the prior art systems handle a given site at a time, since they cannot access component/business information/commercial data information etc. and cannot analyze common themes and changes across multiple sites, including in particular the effect of site changes on the traffic and keyword use for multiple sites across time. Furthermore, sites containing third party applications cannot be readily analyzed as the components of the third party applications (which are separate from the site itself) cannot be accessed by an SEO tool.

It will be further appreciated that there may be different types of wording or text (having differing importance and relevance) that may appear on a page and that all these types of text may be indexed by the search engine and be queried in response to a keyword search. The types of text may include filler text that appears on a page such as general titles, template text which is standard part of a template and therefore may show up multiple times (unnecessarily) in a search and user written text which is the content added by the website designer himself. Applicant has further realized, that for the systems of the prior art, a regular HTML page analyzer cannot distinguish between these types of categories and therefore, may not filter out this irrelevant text, potentially impeding a good search engine ranking for the site by providing unnecessary filler and template text to a spider which may cause a "bad" ranking.

Figure 3A:
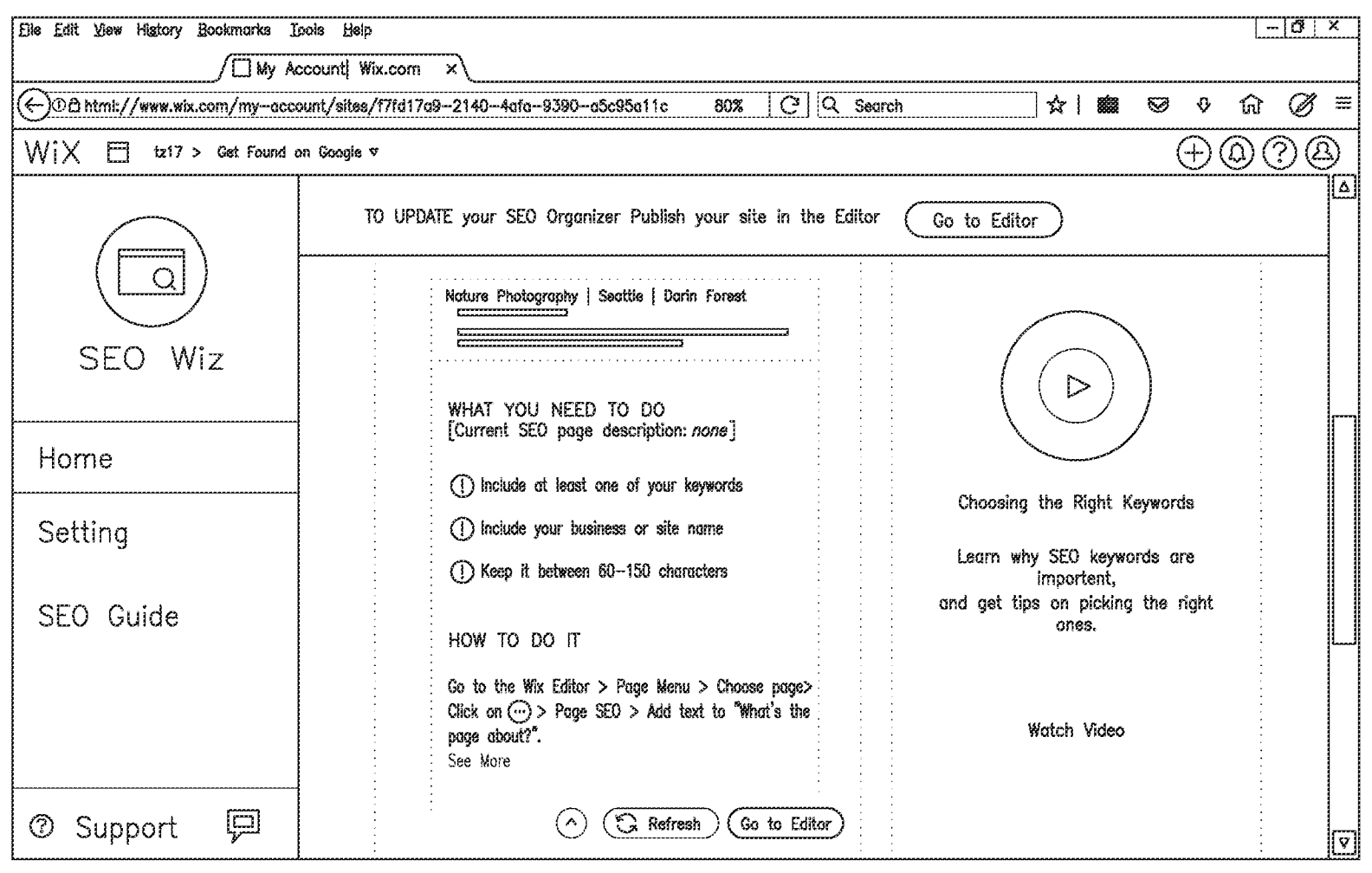

Applicant has further realized that the website building experience together with the above mentioned limitations may be overcome by a system that integrates a search engine optimization tool into an underlying website building system and its processes. As discussed herein above, a good SEO rating is important when trying to promote a website and ensures a good online presence for a website. The system may allow for a search engine rating related analysis of the website building system elements such as components, component compositions such as templates and layouts etc. and combinations of component compositions such as component sets, containers, page section, pages, page sets (partial sites), complete sites and site collections. The system may examine their attributes, features and content and this information may be used together with a similar analysis of website editing history, business intelligence, other sites within the website building system, sites external to the website building system etc. in order to determine and to present recommendations (during website creation and editing) to a designer for components and component arrangements to be used which are known to be more search engine friendly than others. Thus search engine optimization may begin already at the website building stage at the component or element level, thus identifying already at the website building stage, irrelevant text. These search engine friendly elements may include but not be limited to website building system components, templates, readymade layouts etc. The analysis may also be rule based, using artificial intelligence/machine learning or a combination of the two. It will be appreciated that the system may be implemented using a multi-stage wizard user interface such as those illustrated in FIGS. 3A and 3B to which reference is now made. FIG. 3A illustrates a general guideline to a designer of how to improve his site SEO and FIG. 3B illustrates a checklist of actions he may take. Alternatively, the system may be implemented by using a user interface which focuses on a set of pending SEO tasks and enables a website designer to tackle these tasks. It will also be appreciated, that this information may also be used by website vendors during the creation of the basic website building system elements such as components, component sets, templates etc.

It will be appreciated that regular sites generally consist of a set of files (HTML, CSS, JS, . . . ). These files can be created by a designer (e.g. using an editor) or created by a tool which allows visual editing of the site. Website building system based sites consist of components arranged in pages and stored in a database/repository. In particular, with an on-line website building system, the component definition is also used during site browsing, and is converted on-the-fly into the HTML/CSS/JS processed for display by the searching user's browser. The website building system may also produce site elements using other formats which can be handled by browsers, such as the SVG (scalable vector graphics) format. Furthermore, the website building system may produce different HTML site definitions for different designers using the website building system based on their browser, user platform, screen size, geography, language, user type, user history with the system as well as other parameters.

As discussed herein above, website building systems may also use templates (at site, page or page section level) or pre-fabricated page elements of sections to construct a page. The website building system may also use an automated system (such as described in U.S. Pat. No. 10,073,923) to generate the site automatically, possibly generating the site using a collection of pre-fabricated component sets and not just standalone components.

It will be appreciated that an online website building system may maintain additional databases related to the website (including both its design and operation) such as detailed component information (for each component used in the website), back-end/server databases and logic, editing history (including all editing operations by all users of the website building system and all previous site versions) and business intelligence of the site operation (such as user accesses, user navigation within the site etc.) This may also include commercial data for the site (such as product sale information, product feedback etc.).

Figure 4:
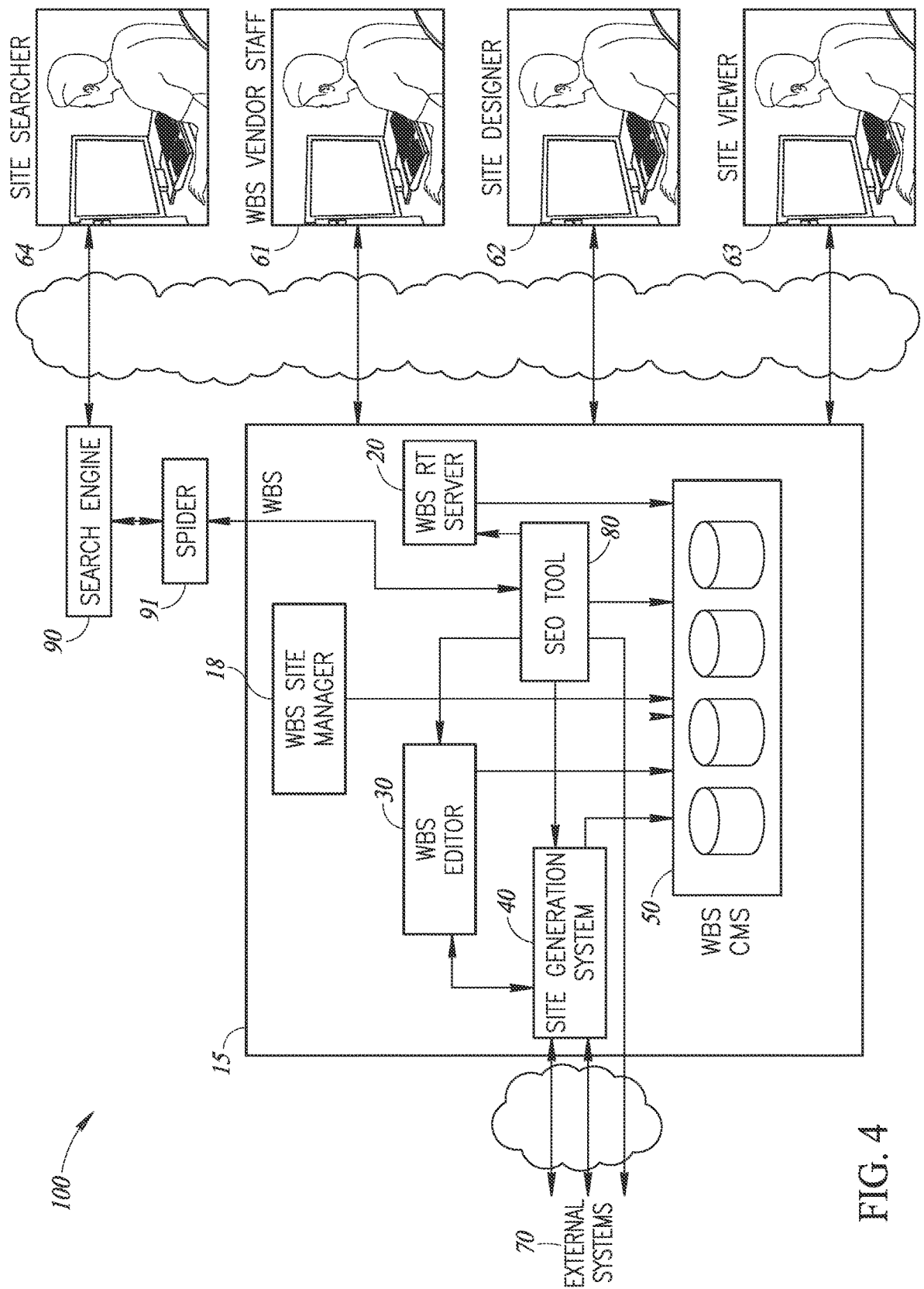
FIG. 4 is a schematic illustration of a website building system with an integrated search engine optimization tool for search engine optimization; constructed and operative in accordance with the present invention.

Reference is now made to FIG. 4 which illustrates a website building system with an integrated search engine tool 100 for search engine optimization according to an embodiment of the present invention.

System 100 may comprise a website building system 15 further comprising a WBS (website building system) site manager 18, a WBS (website building system) runtime server 20, a WBS (website building system) editor 30, a site generation system 40, a CMS (content management system) 50 and an SEO tool 80. Website building system 15 may be in communication with client systems operated by website building system vendor staff 61, a site designer 62, a site viewer 63, a random site searcher 64 and with external systems 70. System 100 may also be in communication with a search engine 90 and a spider 91. Search engine 90 may be any standard internet search engine such as the Google search engine (commercially available from Alphabet Inc.).

It will be appreciated that system 100 and the functioning of its elements may be similar to that of system 100 as described in US Patent Publication No. US 2018-0032626 entitled "System and Method for Implementing Containers Which Extract and Apply Semantic Page Knowledge" published on 1 Feb. 2018, incorporated herein by reference and assigned to the common assignee of the current invention.

The following description discusses system 100 in the realm of websites created by a website building system and accessed or searched for by site searchers 64. It will be appreciated that system 100 may be applicable to other categories of on-line applications which are accessed using specific client software (proprietary or not). Such client software may run standalone or be activated from a browser (such as the Adobe Flash plug-in). Site viewers 63 may access these websites using client software on regular personal computers as well as smart-phones, tablet computers and other desktop, mobile or wearable devices. In an alternative embodiment to the present invention, system 100 may be applicable to systems which generate mobile applications, native applications or other application types as described in U.S. Pat. No. 9,996,566, entitled "Visual Design System for Generating a Visual Data Structure Associated with a Semantic Composition Based On a Hierarchy Of Components" issued on 12 Jun. 2018, incorporated herein by reference and assigned to the common assignee of the current invention.

Website building system 15 may implement some of its functionality (including both editing and run-time functionality) on a server or server set and some of its functionality on client elements such as the ones described herein above. It will be appreciated that each server of the server set, and the client may comprise at least one processor and at least one memory unit. Website building system 15 may also determine dynamically whether to perform some functionality on the server or on the client platform. It will also be appreciated that a separate thread or resource of the processor may be allocated to SEO tool 80.

The discussion below further focuses on websites hosted by a website building system provider, and in particular on websites providing on-line presence for small and medium businesses such as hotels, law offices and restaurants. Such businesses may often be classified according to their family and industry, as discussed in U.S. Pat. No. 9,996,566. The family defines the general type or category of the enterprise such as a school, clinic, law office etc. The industry is a specific industry or knowledge domain type. For example, for the school family, the system may support multiple industries (i.e. school types) such as art, engineering, and music schools.

The discussion below also discusses website search engines. In alternative embodiments, system 100 may also be applied to other visual creation types (such as mobile applications) and search engines adapted to index and search such visual creations (such as described in U.S. Pat. No. 9,996,566 and in US Patent Publication No. 2017/0032050 entitled "System Integrating a Mobile Device Application Creation, Editing and Distribution System With a Website Design System" published 2 Feb. 2017, and issued as U.S. Pat. No. 10,769,231 on Sep. 8, 2020, incorporated herein by reference and assigned to the common assignee of the current invention).

Figure 5:
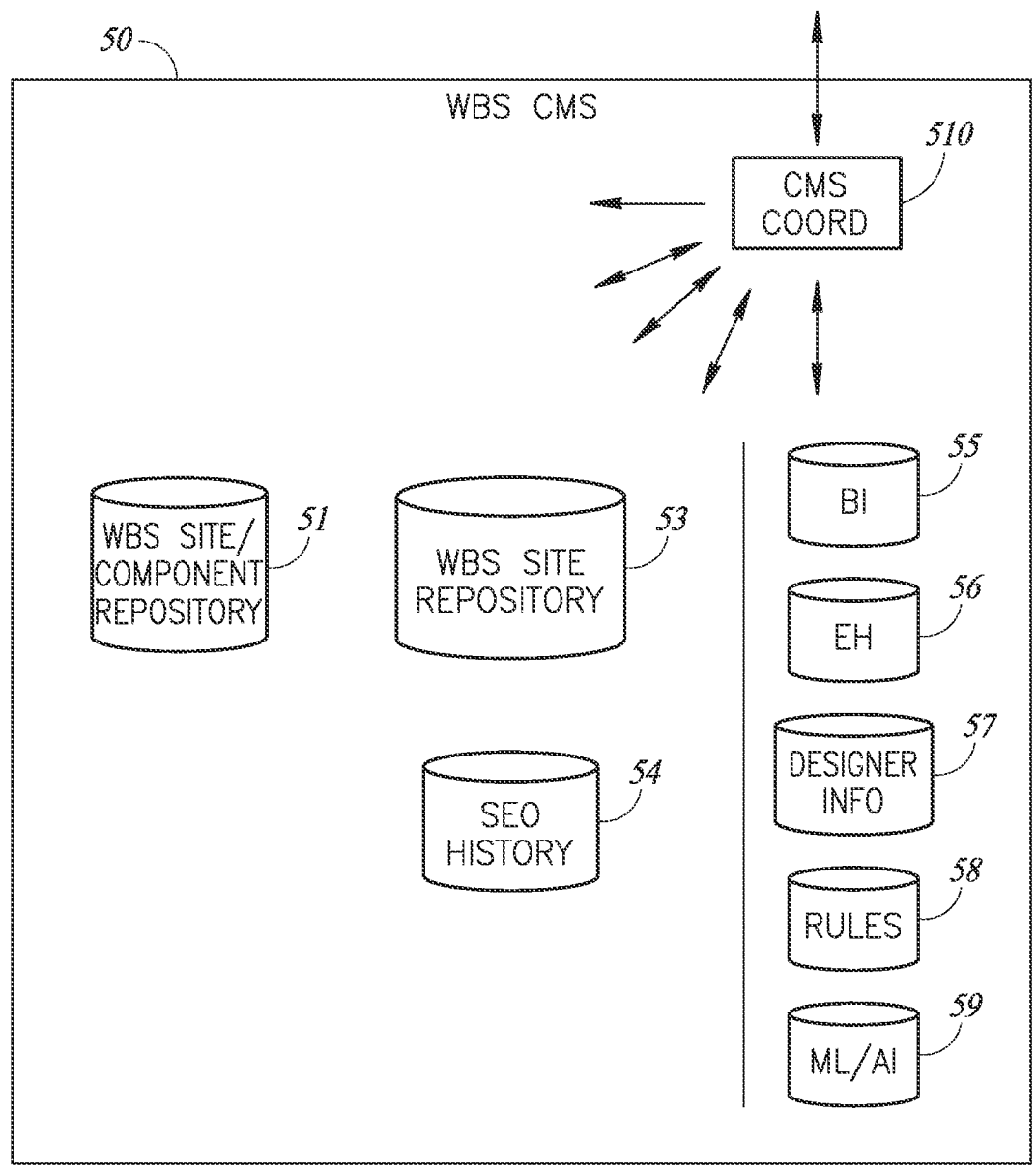
FIG. 5 is a schematic illustration of the elements of the content management system of FIG. 4; constructed and operative in accordance with the present invention.

CMS 50 may hold all forms of content and layout pertinent to website building system 15 as is illustrated in FIG. 5 to which reference is now made. Content management system 50 may comprise a WBS site/component types repository 51, a WBS site repository 53, an SEO history repository 54, a business intelligence repository 55, an editing history repository 56, a designer information repository 57, a rules repository 58, a ML/AI (machine learning/artificial intelligence) repository 59 and a content management system coordinator 510 to coordinate data between content management system 50 and system 100. It will be appreciated that the setup and functioning of CMS 50 may be similar to that of CMS 50 as described in U.S. Publication No. US 2018/0032626.

It will be appreciated that WBS site/component types repository 51 and a WBS site repository 53 may also store associated SEO ranking information (such as ranking history, ranking hints, plug-in code for ranking calculation/recommendation etc.) for the component and component compositions as discussed in more detail herein below.

SEO history repository 54 may store information relating to previous searches for the sites hosted by website building system 15 such as specific queries, SERP results and possibly statistics of actual answers by search engines 90 (such as the top X results returned by a given query).

Figure 6:
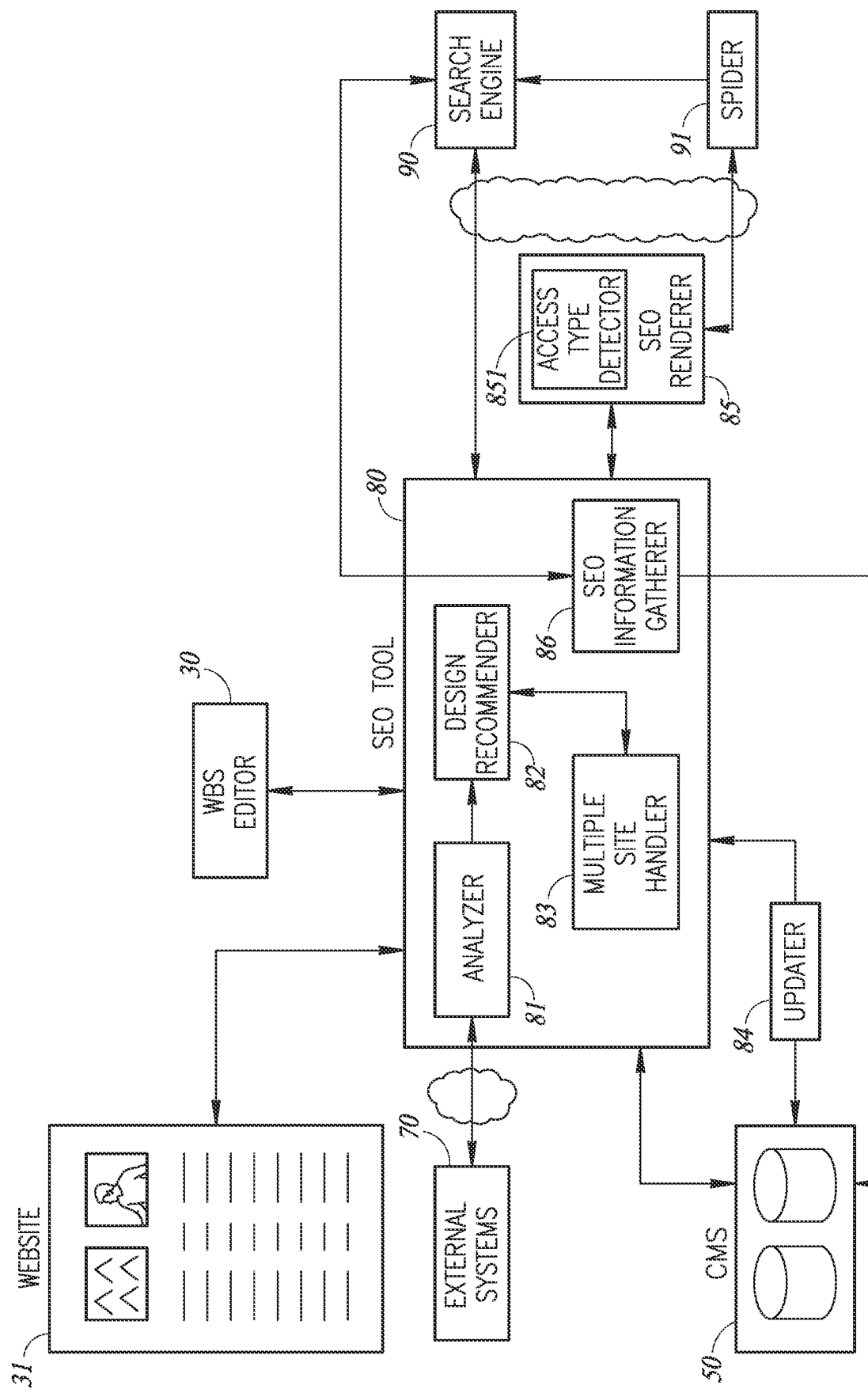
FIG. 6 is a schematic illustration of the relationship between the SEO tool and WBS editor of FIG. 4 and a website hosted by the website building system of FIG. 4; constructed and operative in accordance with the present invention.

Reference is now made to FIG. 6 which illustrates the elements of SEO tool 80 and the relationship between WBS editor 30, SEO tool 80, website building system 15 and a website 31 hosted by website building system 15. It will be appreciated that SEO tool 80 (and website building system 15) may communicate with both spider 91 and search engine 90. SEO tool 80 may further comprise an analyzer 81, a design recommender 82, a multiple site handler 83 and an SEO information gatherer 86. Website building system 15 may further comprise an updater 84 and a SEO renderer 85. SEO renderer 85 may further comprise an access type detector 851. The functionality of these elements is described in more detail herein below.

SEO information gatherer 86 may gather the information stored in SEO history repository 54. It may gather this information based on HTTP referrer information provided to system 100 whenever a website page is reached via a query. SEO information gatherer 86 may also extract this information using additional techniques, which may include interfacing with a search engine vendor provided tool (such as Google analytics), a service or an API, using multiple landing pages (with different keywords) to analyze incoming search traffic and by automatically interacting with the search engine 90 itself to execute queries based on keywords and analyzing the returned result pages.

It will also be appreciated that analyzer 81 may analyze and collect information based on the relationship between website building system components and the history of searches related to website building system 15 (including their outcome) stored in SEO history repository 54 based on keyword use, site elements, content elements, external sites etc. as discussed in more detail herein below.

Figure 7:
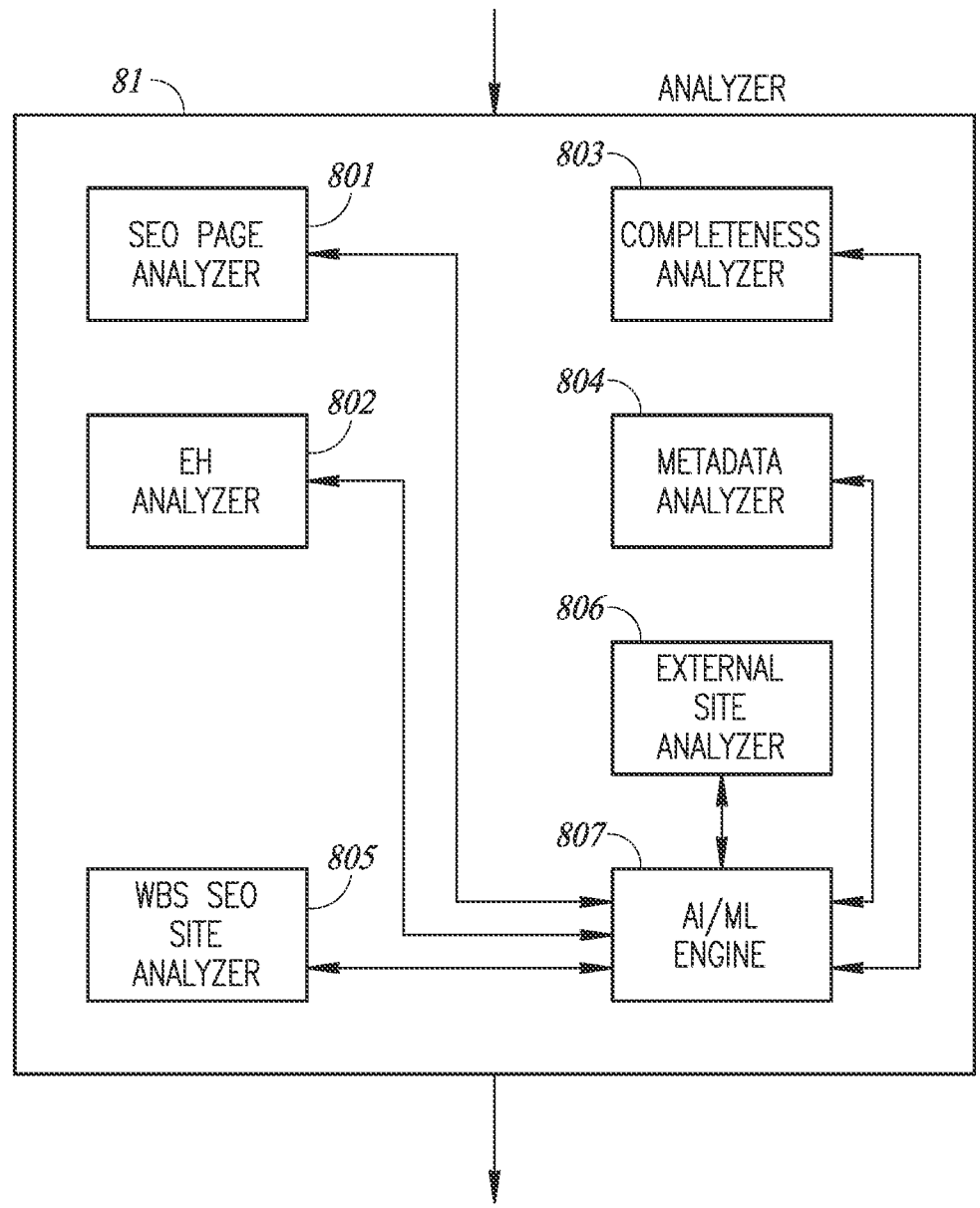
FIG. 7 is a schematic illustration of the elements of the analyzer of FIG. 4; constructed and operative in accordance with the present invention.

Reference is now made to FIG. 7 which illustrates the elements of analyzer 81. Analyzer 81 may comprise a SEO page analyzer 801, an EH (editing history) analyzer 802, a completeness analyzer 803, a MCD (metadata, content and design) analyzer 804, a WBS SEO site analyzer 805, an external site analyzer 806 and an AI/ML engine 807

It will be appreciated that depending on the functionality required by analyzer 81, not all the elements as described herein above are activated each time SEO tool 80 is in use.

Design recommender 82 may receive the results of analyzer 81 and recommend changes to designer selected website components or component compositions as designer 62 creates or edits his website based on a provided SEO ranking as described in more detail herein below. Accordingly design recommender 82 may also recommend changes to elements stored in CMS 50. For both scenarios, updater 84 may update CMS 50 correspondingly. It will be appreciated that recommendations and therefore changes to the elements may include adjustments and improvements or may include replacement of the element itself to a more SEO friendly version. The recommendations may include changes to site metadata, titles, keywords, site and component attributes etc. It will also be appreciated that updater 84 may be invoked by designer 62 when designer 62 is prompted with a recommended change (as described in more detail herein below) and designer 62 confirms the change. In alternative scenarios, designer 62 may perform the change himself (when prompted accordingly by design recommender 82) when the change cannot be automated. For example designer 62 may receive a message such as "The text in your description is not unique enough, please edit it to better reflect your business".

Renderer 85 may render an updated search-engine-friendly view which is easier to index (e.g. uses a simpler generated HTML) which is presented when the webpage is accessed by spider 91. Renderer 85 may have similar functionality to search engine friendly renderer 46 as described in U.S. Pat. No. 9,436,765 entitled "System for Deep Linking and Search Engine Support for Websites Integrating Third Party Application and Components" granted 6 Sep. 2016, incorporated herein by reference and assigned to the common assignee of the current invention.

As discussed herein above, CMS 50 may store full component definitions, content and parameter information, which may be analyzed by analyzer 80 at the component level, rather than at the generated final form HTML level. It will be appreciated that component-based site analysis is different from analyzing (and reverse-engineering) the HTML code. For example, analyzing the complex multi-element HTML code which implements a picture gallery is much more difficult than accessing a website building system's clearly defined picture gallery component (and may in fact be impossible).

SEO page analyzer 801 may analyze the pages of a website built using website building system 15 at the component level. For example, it may directly access the underlying database (in CMS 50) for a large gallery (which displays images and associated information) and analyze all of the images and information therein. It will be appreciated that this may provide superior results to analyzing just the currently displayed or loaded images and associated text (which may be a small subset of the database) and which may be visible in the website's final form. In this scenario, SEO page analyzer 801 may scan all images in the database and check that they all have ALT-text (possibly verifying the ALT-text against the relevant image via image/text analysis, or even automatically generating the ALT-text).

It will be further appreciated that website building system 15 may further comprise an SEO plug-in operated by SEO tool 80 to more deeply check a specific component type since analyzer 80 may unable to perform such analysis on its own. Such components may be complex components or externally supplied components (such as those supplied from a third party application with inaccessible internal information). A supplier of such a component may provide an SEO plug-in for the component, which may provide its own SEO analysis and information, based on the provider's deep knowledge of the internal information of the pertinent component. It will be appreciated that SEO analyzer 80 may integrate the results of this analysis by the SEO plug-in with results from the analyses of the rest of the site. It will be appreciated that such a plug-in may provide component specific SEO support (such as content/use analysis, SEF version generation and modification recommendations). It will be further appreciated that this may be critical for website building systems which have a very large collection of components, or which have the ability to add components defined by external vendors or by site designer 62 himself.

It will be further appreciated that the above may apply not just to components, but also to other website components such as templates (site/page/section etc.) or to other pre-fabricated component sets (which may have their own search engine friendly version plug-in and/or SEO plug-ins).

It will also be appreciated that the above may apply to third party applications of all types. As discussed herein above, existing systems which access sites containing a third party application cannot analyze the third party application (which is separate from the site itself). System 100 may interface with the third party application (possibly using a third party application specific SEO plug-in, a search engine friendly version plug-in or server-to-server communication). It will be appreciated that when using server-to server communication, the third party application server may provide information directly to website building system 15 without the use of a plug-in. SEO and third party applications are further described in U.S. Pat. No. 9,436,765.

Thus, SEO tool 80 may expand to cover new components and component compositions including private (propriety) components which may exist in some versions or installations of website building system 15 but not in others.

EH analyzer 802 may analyze all website editing history which may be stored in editing history repository 56. EH analyzer 802 may examine previous versions of a given page or its components (changed during a past editing session), and evaluate if a previous version of any of the components (or previous component content, arrangement or layout) offers better SEO performance. EH analyzer 802 may match between changes to the website (extracted using stored editing history repository 56 and previous version of the website as stored in WBS site repository 53) and changes to the SEO performance/SERP of the site as stored in SEO history repository 54. This could be, for example, the previous use of keywords which provide better SEO. For example, EH analyzer 802 may prioritize text content according to the amount of effort invested in its editing (as expressed in editing time or number of changes) thus providing information about text elements are more important to the specific site.

Completeness analyzer 803 may provide an on-going feedback regarding how complete the site is for release and publication by comparing the results of page analyzer 801 and the results of design recommender 82.

It will be appreciated that site content (text/images) may originate from a template, a stock media origin (especially images) or may be self-created in the editing environment (text but also images which may be uploaded by site designer 62). Both SEO page analyzer 801 and completeness analyzer 803 may differentiate between the different categories in order to determine what importance to associate with keywords based on the different sources. This may enable SEO page analyzer 801 to know what importance to attach to different site media elements since some of them may be more unique to the site and thus should not be replaced. Completeness analyzer 803 may use this to determine how close the site is to being complete and ready to publish. For example, keywords extracted from a boilerplate template text (and not unique to the specific site) may be less important than those created manually via designer 62 editing. For images taken from stock media (assuming they are from a library managed by website building system 15), SEO page analyzer 801 and completeness analyzer 803 may also take into account the number of times each image (or other media segment) was used by the different website building system users, in order to promote media diversification and site uniqueness.

It will be appreciated that for an on-line website building system 15, website building system 15 may have complete information regarding the site's visitor accesses and traffic (i.e. visitor behavior in the site, its business intelligence) and possibly the commercial data of the site (i.e. product orders, product reviews, conversion of visiting users to paying customers etc.). Furthermore, in the case of visitors arriving at the site via a search engine query, website building system 15 may have the relevant query used (from the HTTP referrer information).

Based on this information, and the access to CMS 50, MCD analyzer 804 may determine the SEO advantage of metadata info, content and design for specific site pages by correlating the different metadata/content/design used across different sites, designs and site versions against actual SERP/traffic results for various queries as stored in SEO history repository 54. It will be appreciated that this may include the effect of changes (to keywords and other metadata, to alternative site/page/section templates, to site content, to design etc.) on visitor traffic.

As discussed herein above, website building system 15 may collect data (editing history, site commercial data, business intelligence etc.) as well as SEO history (including SERP results) for the multiple sites that are hosted by website building system 15. These sites may share elements between them from specific component types to templates (site, page or section) to component content (stock media or predefined texts). This is particularly relevant in sites belonging to owners from the same industry and business family (e.g. real estate lawyers) which may use the same template, or a very similar generated site element collection as described in U.S. Pat. No. 10,073,923. The owners of such sites which share elements may be, for example, direct competitors (e.g. two pizzerias sharing a serviced area) or similar but non-competing businesses (e.g. two pizzerias located in different countries). They may also be unrelated businesses (e.g. two unrelated organizations which happen to start their website design based on the same template or using a similar set of elements).

WBS SEO site analyzer 805 may analyze the relationship between website building system elements and SEO effectiveness (such as metadata and keyword use, site elements, element content/layout/presentation/rendering etc.) across multiple client sites by correlating the different "inputs" (website building system designs, meta data etc.) with the matching "outputs" (SEO results, SERP, traffic etc.). It will be appreciated that such information is not available to prior art systems which handle a given site at a time, since they cannot access component/business information/commercial data information etc. and cannot analyze common themes and changes across multiple sites, including in particular the effect of site changes on the traffic and keyword use for multiple sites across time.

It will be appreciated that although the information may be collected across multiple sites (possibly belonging to competing organizations), WBS SEO site analyzer 805 may preserve the privacy and rights of each site owner and according to the relevant local laws governing website access. Thus, WBS SEO site analyzer 805 may be limited to gathering summarized data only, and may not provide private information from one site to another site.

It will be further appreciated that the collection of multisite data, especially when done in conjunction with AI/ML engine 807 (as described in more detail herein below) may allow SEO tool 80 to create an overall "image" of the search engine behavior. Multiple instances of such an "image" may be created, one for each of the leading commercially available search engines. This is important as the underlying criteria used by the leading search engines are proprietary, and may further be based on large-scale deep learning engine (and thus are not explicitly specified or clearly understood, even to the search engine vendor staff). This way, SEO tool 80 may optimize search ranking for a large number of sites without having access to the exact search engine indexing algorithms and criteria.

External site analyzer 806 may examine competitor sites to determine the keywords used by them and the design/layout/content they employ. Such competitor sites may be explicitly specified by designer 62, located (e.g. based on data extraction from local business directories, such as Yelp, Google maps etc.) or detected (e.g. by querying a search engine and analyzing the returned results and advertised sites). External site analyzer 806 may analyze using a spider-like site information gathering module and a rule-based or AI/ML-engine based analysis module, which may modify its analysis as the search engine behavior changes over time. The analysis may include locating external sites via business directories or by querying existing search engines, by analyzing and prioritizing sites based on the SERP (possibly across multiple search engines 90), analyzing according to relevant user or site parameters (line of business, geographical location etc.) and then determining the most relevant changes to the current site. The analysis may also include analysis of the positioning of the competitors in various search engine results pages (in one or more search engines) when querying using different keywords. It will be appreciated that as discussed herein above for WBS SEO site analyzer 805, external site analyzer 806 may limit provided information in order to preserve the rights of external site owners as appropriate and as required by the relevant local laws governing website information collection (even though external site analyzer 806 is limited to publically accessible information).

External site analyzer 806 may match the best competitors based on signals from the line of business, geographical location, size of business, social media presence and detailed description of the business etc. of the site of designer 62. All signals may be taken into consideration by external site analyzer 806, including the data extracted from local business directories and search engine competitor results (as discussed herein above).

External site analyzer 806 may limit its analysis to competitors which have a better SEO than the site of designer 62 and for all of those found, external site analyzer 806 may create another analysis to detect the good SEO signals which gives these competitor sites better search engine result page positioning.

External site analyzer 806 may also monitor competitor sites over time (including both "internal" but accessible data such as keyword use and externally visible data), in order to detect changes made to these tracked sites and use these changes when suggesting SEO alternatives to designer 62.

It will be appreciated that all the elements of analyzer 81 may refine their results and recommendations using AI/ML engine 807. The functioning of AI/ML engine 807 may be similar to that as described in U.S. Pat. 10,073,923. This may include providing website building system initiated recommendations to site designers 62 who were not actively attempting to optimize their site search ranking at the present moment.

It will be appreciated that since search engines may change their behavior over time, either explicitly (if the search engine algorithms are updated) or implicitly (as the behavior of an AI-based search engine changes rapidly based on its input data and the resulting training). AI/ML engine 807 may also adapt in parallel to such changes to each search engine based on the combined data gathered from multiple sites.

As discussed herein above, design recommender 82 may recommend design changes (and thus recommend alternative more search engine friendly component compositions) for a website in order to improve its SEO rating based on the results of analyzer 81.

Figure 8:
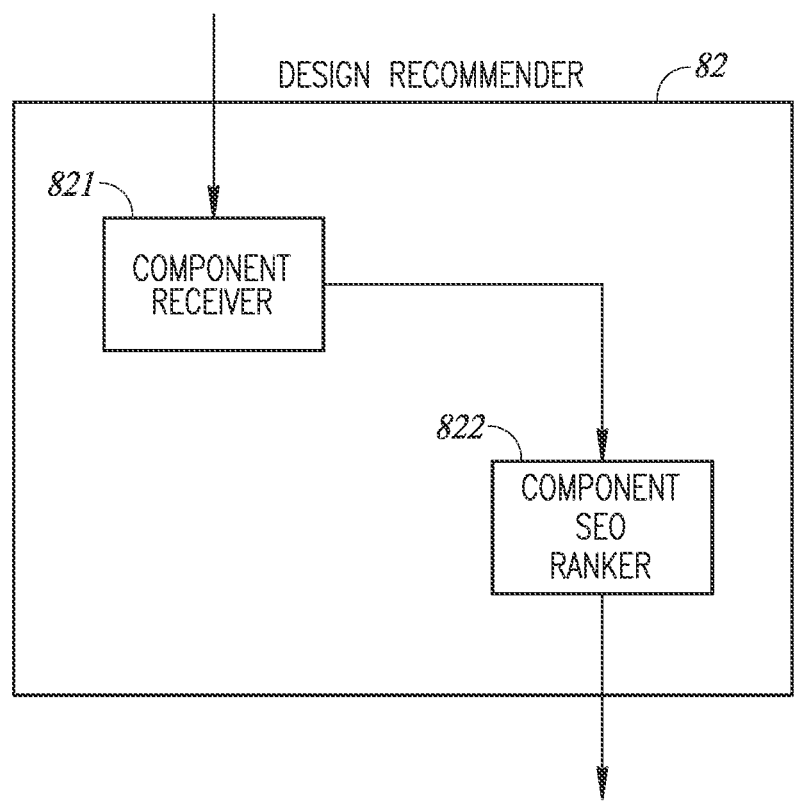
FIG. 8 is a schematic illustration of the elements of the design recommender of FIG. 6; constructed and operative in accordance with the present invention.

Reference is now made to FIG. 8 which illustrates the elements of design recommender 82. Design recommender 82 may further comprise a component receiver 821 and a component SEO ranker 822. Component receiver 821 may receive and analyze the current website components being used by designer 62 to create or edit his website and component SEO ranker 822 may check the SEO ranking scores of the website components and component compositions against the ranking scores of other website components and component compositions in WBS site/component types repository 51 and WBS site repository 53 to determine whether an update should be made, or an alternative be recommended. It will be appreciated that that function of SEO ranker 822 may be similar to that of ranker 48 as described in U.S. Pat. No. 9,747,258 entitled "System and Method for the Creation and use of Visually-Diverse High-Quality Dynamic Layouts" issued on issued 29 Aug. 2017, incorporated herein by reference and assigned to the common assignee of the current invention.

SEO ranker 822 may provide an alternative component composition to a current component composition that has an equivalent functionality, based on (for example), semantic type mapping of included components. SEO ranker 822 may take into account a quality metric (such as a design quality or an SEO contribution) together with the diversity between offered alternatives, also taking into account diversity against other sites (so that the same alternatives are not offered to all designers causing multiple identical looking websites. Such diversity may be based on design, visual parameters or any other functionality of the alternate design.

It will be appreciated that as analyzer 81 collects information from the different sources as described herein above, component receiver 821 may evaluate each and every decision made by site designer 62 as he builds or edits his site. It will be appreciated that in addition to analyzing the layout, component receiver 821 may also analyze other aspects of the design which may affect SEO rating (such as the use of "white over white text"). Thus design recommender 82 may determine whether an improvement can be made by making changes in the same area, while maintaining overall design and design preferences. It will be appreciated that overall design and design preferences may include individual design element style and attributes. Such changes may also include changes to component content (e.g. modifying the text inside text components to include relevant search keywords), changes to the visual layout (e.g. moving/resizing components or otherwise changing the component layout), changes to the component types (e.g. change a gallery component to a different gallery type while transferring the current gallery content to the new gallery) and changes to site layout (the division of components between pages/sub-pages etc. as well as the order and arrangement of the pages and the links and pathways between the pages).

Other changes may include suggested changes to a template or to a section of a component set (i.e. suggesting an alternative version and transferring the data between the two, or selecting an alternative display mode or rendering for an existing website element). This could apply, for example, to the selection of layout elements as described in the U.S. Pat. No. 10,073,923, or the selection of smart box types (U.S. Pat. No. 9,996,566).

Design recommender 82 may also use information from templates (especially business category specific ones) which provide hints for their "contribution" to SEO material gathering (for example a given template may provide a specific set of factors which indicate its SEO ranking contribution based on the field information added to it).

It will be appreciated that design recommender 82 may have access to CMS 50 and to all website building system 15 template information, including which templates (at all levels) are similar or interchangeable with other templates. It may also have information about the actual use of each template by site designers 62. Thus, design recommender 82 may offer alternate templates to a given template in use so as to help in diversification among different websites created by designers 62 in a similar category (such as a "real estate lawyer" or a "karate dojo") based on this information and any ranking information from SEO ranker 822. It will be further appreciated that this capability is of particular importance for large scale website building systems (with numerous created sites) since in such a website building system there can be many sites created from each template, and a very large number of such offered templates.

Design recommender 82 may further improve this diversification using elements of the templates which can be randomly selected from a given range of options (all having better SEO ranking scores) creating numerous combinations.

Furthermore, design recommender 82 may use the results of analyzer 81 for individual site SEO feedback. Design recommender 82 may instruct updater 84 to attach and store it with the website building system component information, providing (for example) SEO feedback to WBS vendor staff 61. Thus, for example, if a specific page design or boilerplate text is repeated in multiple sites and brings very bad SEO results, WBS vendor staff 61 may be alerted and may modify any text or design accordingly. Furthermore, this analyzed per-template/component/media/data may be used by SEO tool 80 for future rounds of SEO activity. It will be appreciated that the more sites that are designed and hosted by website building system 15, the more data is collected and the better the SEO recommendation may become.

Figure 9:
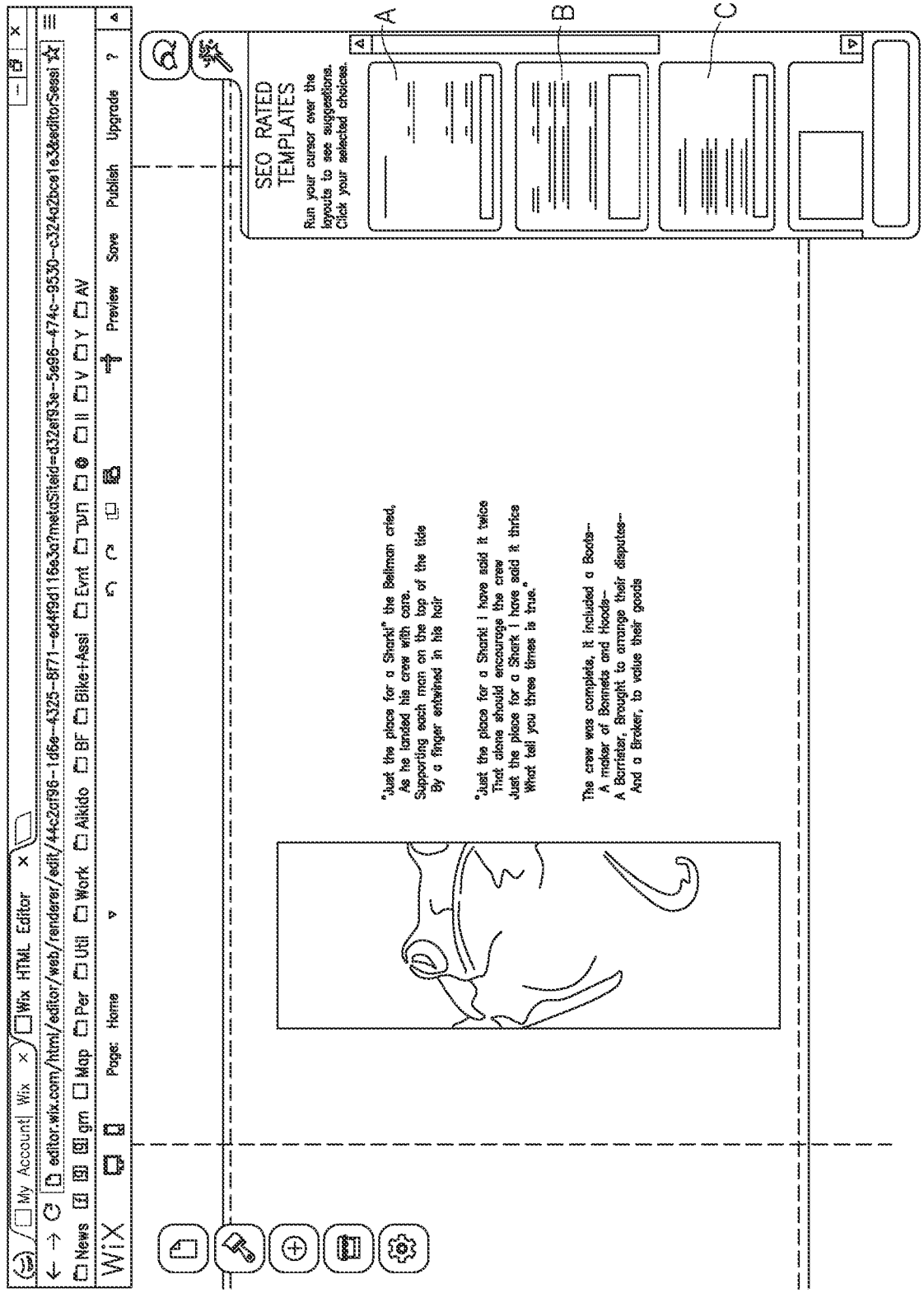
FIG. 9 is a screenshot of an example user interface offering better SEO components to a designer based on his component choices; constructed and operative in accordance with the present invention.

It will be appreciated that design recommender 82 may directly activate WBS editor 30, to (for example) allow the suggested changes to be performed automatically or semi-automatically (e.g. subject to designer 62 approval) through a suitable interface. Reference is now made to FIG. 9 which illustrates such a sample user interface offering alternative layouts which are known to be more SEO friendly than the template in use. It will be appreciated that in this scenario, design recommender may instruct WBS editor to offer alternative templates (A, B and C) which have a SEO ranking higher than currently selected template.

It will also be appreciated that design recommender 82 may make its recommendations in real-time during editing or pre or post publishing of the site. Thus SEO tool 80 may be activated on each component change, periodically (based on internal check every X seconds), on each save, pre-publishing or post publishing.

It will also be appreciated that SEO tool 80 may be integrated with the editing process, e.g. by displaying on-going SEO feedback during editing using WBS editor 30. This way, designer 62 may be warned right away when he's performing editing which may have a SEO-negative result and therefore may invest less (wasted) effort going in such a specific (SEO-negative) direction. WBS editor 30 may offer content/design alternatives (as described in U.S. Pat. Nos. 9,996,566 and 9,747,258) to designer 62 edits which may provide better SEO results.

As discussed herein above, existing SEO tools of the prior art typically operate on the already hosted and published site. It will be appreciated that an early activation of SEO tool 80 during editing or saving (or otherwise before publishing) may prevent a designer 62 from publishing a non-optimized site, which could be detected by a search engine and marked as a "bad site", a marking may remain in place even after the site was later improved.

It will be appreciated that website building system 15 may present different versions of a site (and each page in it) based on the same underlying site definitions. Such versions may be generated for mobile device use, multiple screen size support, language translation and accessibility. For example website building system 15 may present the same site in different languages or different versions of a site depending on the season of the year.

Multiple site handler 83 may coordinate between these versions, making sure appropriate changes are coordinated between the multiple versions. Multiple site handler 83 may make sure that the version of the site being worked on provided to spider 91 for indexing properly represents (and is aligned with) the multiple possible displayed site versions, so as not to be penalized by search engines (which often penalize a site when its indexed and displayed versions are different). It will be appreciated that SEO tool 80 may support search engines which do automatic translation, e.g. searching for foreign-language versions of the specified keywords by suggesting optimal keyword selections taking multiple site versions and foreign-language versions into account.

It will be appreciated that currently, the Google search engine is the leading international search engine, and is vastly dominant compared to competing search engines. Most SEO systems are designed with the Google search engine in mind, and without much regard to other search engines.

However, in the future the situation may change and due to competition, Google itself may offer multiple search engines which may have differing ranking criteria (e.g. for sites adapted to VR/AR use vs. regular sites). Thus, there is a need to support a site with multiple concurrent (and potentially conflicting) SEO strategies. It will also be appreciated that in an alternative embodiment, system 100 may develop strategies which perform well under multiple engines (e.g. presuming that all engines will downgrade some bad-SEO techniques such as white text over white background use).

System 100 may also detect which search engine spider is accessing the site using access type detector 851, the functionality of which may be similar to access type detector 41 as described in U.S. Pat. No. 9,436,765, and may instruct renderer 85 to generate the search engine friendly version web site components or component compositions appropriate for that engine. Alternatively, system 100 may create multiple underlying databases or deep learning engines for the different search engines, so that system 100 may determine how to handle each engine separately.

Thus, search engine optimization may be started at the website creation stage, ensuring from the very beginning a strong SEO website. In particular, SEO tool 80 may operate at the initial site construction stage (in particular when site generation system 40 is used), in order to rank the initial design recommender 82 suggestions, such as these provided during such site generation process as described in U.S. Pat. No. 10,073,923. Thus, SEO tool 80 may use information provided early in the site generation process to provide SEO-based support for later system behavior (i.e. which alternatives to offer in the site generation process) or designer 62 (i.e. react to specific designer 62 choices). This could be very effective for designer 62, as choosing the right template or site elements to use during site generation may make the site much better in the long run without requiring later (and possible substantial) changes.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer or a client/server configuration selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system (WBS), said WBS comprising:
   at least one processor;
   at least one database storing at least WBS component compositions of multiple websites built using said WBS, editing history of said multiple websites and SEO (search engine optimization) history of said multiple websites; and
   an SEO tool running on said at least one processor to gather and analyze SEO performance of the use of said WBS component compositions and of third party applications contained in said multiple websites according to said SEO history and said editing history and to make design recommendations accordingly for creating and editing a website for users of said WBS to provide an SEO advantage, wherein said SEO tool comprises:
   an SEO information gatherer to gather said SEO history via at least one of: receiving HTTP (Hypertext Transfer Protocol) referrer information via a query, interfacing with a search engine vendor provided tool, service or API (Application Programming Interface), using multiple landing pages with different keywords to analyze incoming search traffic and interacting with the search engine to execute queries based on keywords;
   at least one analyzer to analyze at least said SEO history and said editing history for said WBS component compositions to provide an SEO ranking for said WBS component compositions accordingly; and
   a design recommender to implement said design recommendations according to said at least one analyzer.

2. The WBS according to claim 1 wherein said WBS component compositions are at least one of: components, templates, pre-defined layouts and combinations of other component compositions.

3. The WBS according to claim 1 wherein said SEO history comprises of at least one of: specific queries, use of keywords, search engine result pages (SERP) and statistics of search engine results.

4. The WBS according to claim 1 wherein said editing history comprises a history of editing operations by users of said WBS.

5. The WBS according to claim 1 wherein said SEO tool comprises:
   a multiple site handler to ensure said design recommendations are implemented within other versions of said website having the same site definitions as said website.

6. The WBS according to claim 1 wherein said design recommendations are at least one of a change to: site metadata, a title, a keyword and an attribute.

7. The WBS according to claim 1 wherein said at least one analyzer comprises:
   a SEO page analyzer to analyze a page of said website to determine WBS component compositions and to retrieve SEO history from said at least one database accordingly;
   a website building system SEO site analyzer to analyze the relationship between said WBS component compositions and SEO effectiveness according to at least one of: metadata and keyword use, site elements, content and layout;
   a metadata, content and design analyzer to correlate at least one of: metadata, content and design for pages of said website used across different websites, designs and site versions with said SEO history to determine the SEO advantage of using said at least one of: metadata, content and design;
   an external site analyzer to analyze search engine results of competitor sites of said website to determine at least one of keyword, design and content rating; and
   an artificial intelligence/machine learning engine to refine the results of said SEO page analyzer, said website building system SEO site analyzer, said metadata, content and design analyzer and said external site analyzer based on at least one of: artificial intelligence and machine learning.

8. The WBS according to claim 1 and further comprising:
   an SEO renderer to render an updated search engine friendly view of said website according to said design recommendations; and
   an updater to perform adjustment of said WBS component compositions according to said design recommendations and to update said at least one database accordingly.

9. A method for a website building system (WBS), said method comprising:
   storing in at least one database at least WBS component compositions of multiple websites built using said WBS, editing history of said multiple websites and SEO (search engine optimization) history of said multiple websites;
   gathering and analyzing SEO performance of the use of said at WBS component compositions and of third party applications contained in said multiple websites according to said SEO history and said editing history; and
   making design recommendations accordingly for building and editing a website for users of said WBS to provide an SEO advantage,
   wherein said gathering and analyzing comprises:
      gathering said SEO history via at least one of: receiving HTTP (Hypertext Transfer Protocol) referrer information via a query, interfacing with a search engine vendor provided tool, service or API (Application Programming Interface), using multiple landing pages with different keywords to analyze incoming search traffic and interacting with the search engine to execute queries based on keywords;
      analyzing at least said SEO history and said editing history for said WBS component compositions to provide an SEO ranking for said WBS component compositions accordingly; and
   wherein said making design recommendations comprises:
      implementing said design recommendations according to said analyzing.

10. The method according to claim 9 wherein said WBS component compositions are at least one of: components, templates, pre-defined layouts and combinations of other component compositions.

11. The method according to claim 9 wherein said gathering and analyzing SEO performance comprises of at least one of: specific queries, use of keywords, search engine result pages (SERP) and statistics of search engine results.

12. The method according to claim 9 wherein said editing history comprises a history of editing operations by users of said WBS.

13. The method according to claim 9 wherein said gathering and analyzing SEO performance comprises:
ensuring said design recommendations are implemented within other versions of said website having the same site definitions as said website.

14. The method according to claim 9 wherein said design recommendations are at least one of a change to: site metadata, a title, a keyword and an attribute.

15. The method according to claim 9 wherein said analyzing at least said SEO history comprises:
analyzing a page of said website to determine WBS component compositions and to retrieve SEO history from said at least one database accordingly;
analyzing the relationship between said WBS component compositions and SEO effectiveness according to at least one of: metadata and keyword use, site elements, content and layout;
correlating at least one of: metadata, content and design for pages of said website used across different websites, designs and site versions with said SEO history to determine the SEO advantage of using said at least one of: metadata, content and design;
analyzing search engine results of competitor sites of said website to determine at least one of keyword, design and content rating; and
refining the results of said analyzing a page, said analyzing the relationship, and said analyzing search engine results according to at least one of: artificial intelligence and machine learning.

16. The method according to claim 9 and further comprising:
rendering an updated search engine friendly view of said website according to said design recommendations; and
performing adjustment of said WBS component compositions according to said design recommendations and to update said at least one database accordingly.

* * * * *